Oct. 26, 1943.  R. D. CLEMSON  2,332,892
LAWN MOWER
Filed March 31, 1941   2 Sheets-Sheet 1

INVENTOR
RICHARD D. CLEMSON.

Oct. 26, 1943.  R. D. CLEMSON  2,332,892
LAWN MOWER
Filed March 31, 1941   2 Sheets-Sheet 2

INVENTOR
RICHARD D. CLEMSON.
BY

Patented Oct. 26, 1943

2,332,892

UNITED STATES PATENT OFFICE 2,332,892

LAWN MOWER

Richard D. Clemson, Middletown, N. Y., assignor to Clemson Bros., Inc., Middletown, N. Y., a corporation of New York Application March 31, 1941, Serial No. 386,029

4 Claims. (Cl. 56—249)

This invention relates to lawn mowers, and particularly to the relationships between the essential components of a lawn mower, i. e., the wheels, the handle, the cutting reel and fixed blade and the ground roller.

It is one object of my invention to make the relationships between the handle, wheels, ground roller, and a frame fixed in the assembly so that a predetermined relationship between these parts is maintained throughout a range of adjustments of the cutting height.

It is another object of my invention to keep the direction of force applied through the handle such that the line of direction will intersect the ground either substantially at the point of contact of the wheels with the ground or behind this point of contact.

It is another object of my invention that the weight distribution of the lawn mower will be substantially undisturbed by changes in the height of the handle or the cutting height of the machine.

Although, in this specification and the accompanying drawings, I have shown and described a preferred embodiment of my invention and various modifications thereof and have suggested various alternatives, these are not intended to be exhaustive nor limiting of the invention, but on the contrary are given for the purpose of illustrating the invention and instructing others in the principles thereof and the best manner of utilizing the invention in practical use, in order that others may be enabled to modify and apply it in numerous forms each as may be best suited to the conditions and requirements of any particular use.

Figure 1:
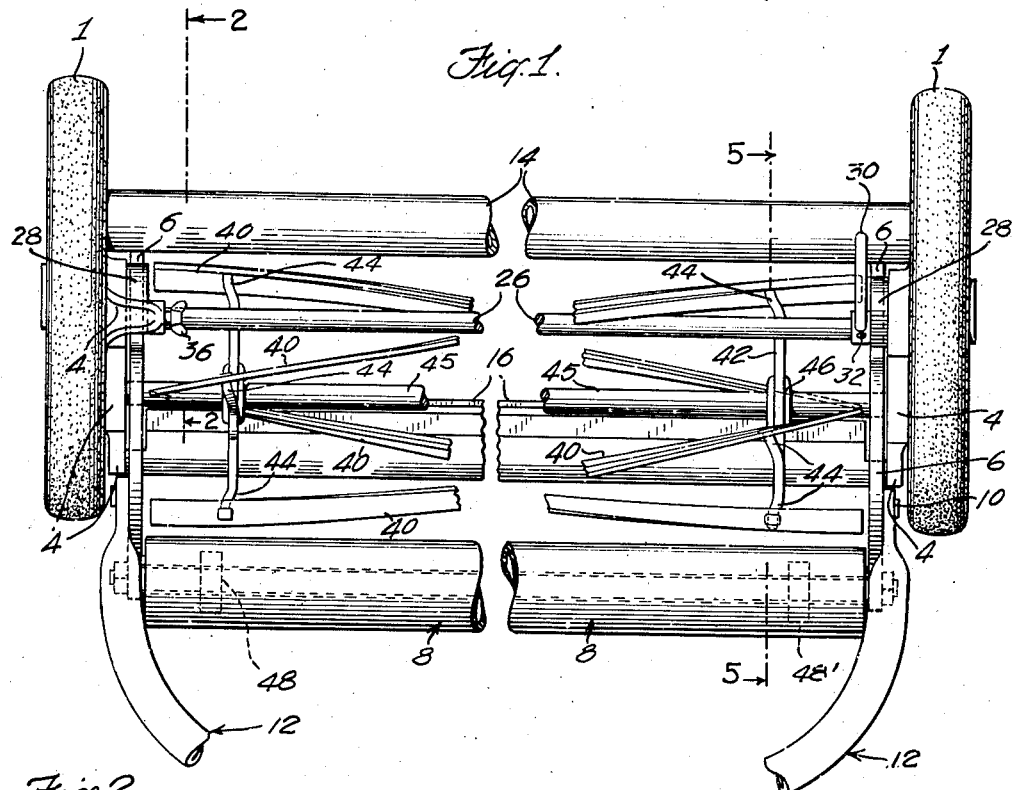
Fig. 1 is a top plan view of a lawn mower with the central portion and part of the handle broken away constructed in accordance with my invention.
Figure 2:
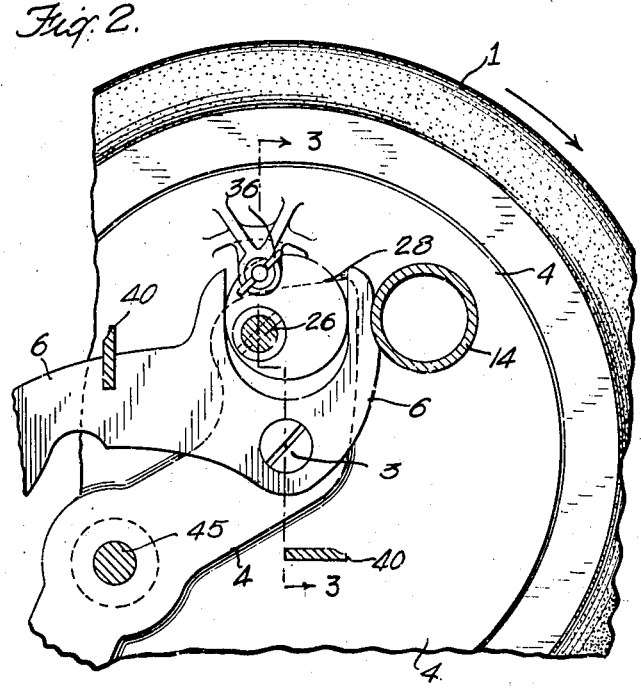
Fig. 2 is an enlarged view of a section through the line 2—2 of Fig. 1.
Figure 3:
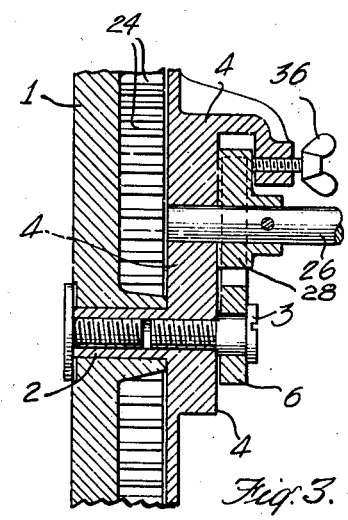
Fig. 3 is a fragmentary sectional view taken on line 3—3 of Fig. 2.
Figure 4:
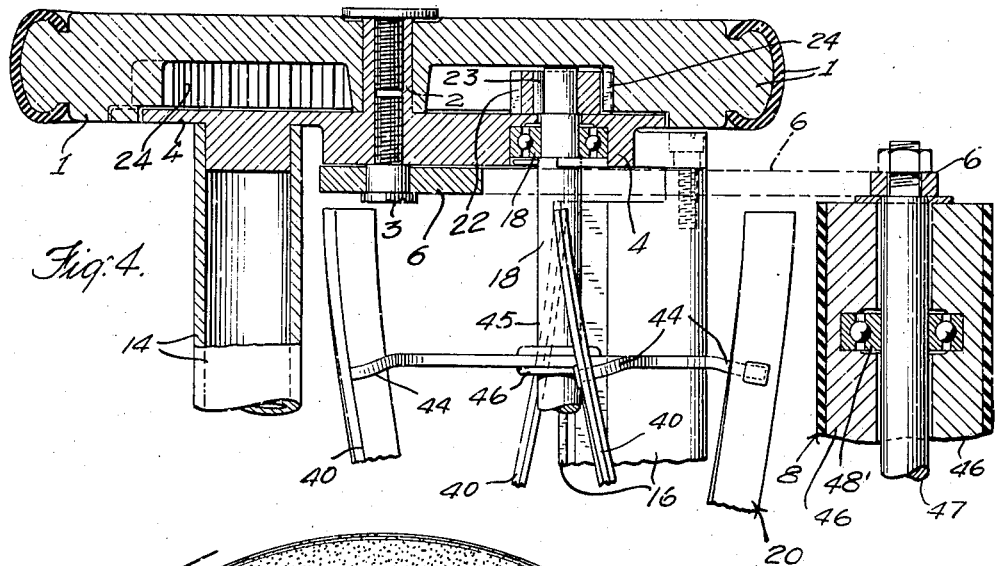
Fig. 4 is a view in cross section taken on line 4—4 of Fig. 5 and showing only one end of the mower.
Figure 5:
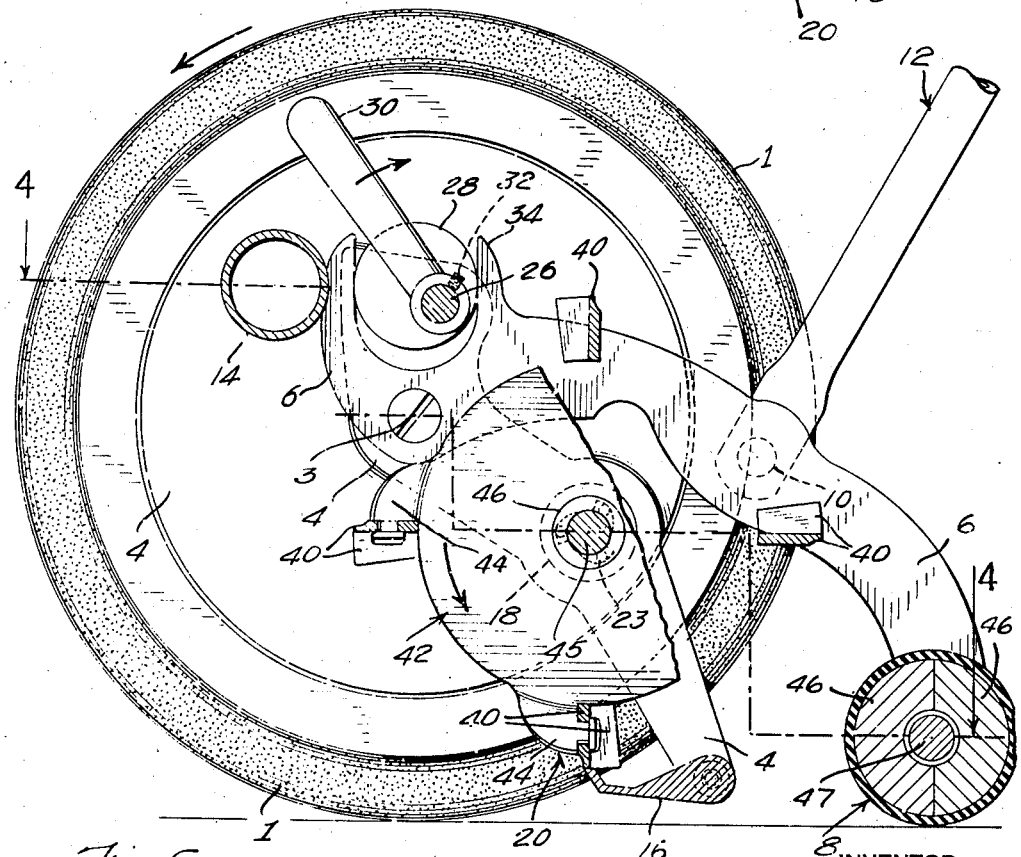
Fig. 5 is an enlarged view partly in elevation and partly in cross section taken on line 5—5 of Fig. 1, of a part of the mower made in accordance with my invention.

Referring first to Fig. 1, I have shown a mower having ground wheels 1, mounted on wheel studs 2, which form a part of the reel frame 4. Pivotally mounted on the same axis, by means of screws 3 threaded into the wheel studs 2 is another frame 6 on which is mounted the ground roller 8 and the studs 10 for the handle 12. Carried on and forming a part of the reel frame 4 is the tie-tube 14 which attaches the two frames on the opposite sides of the mower. Also carried on the frame 4 is the bed knife 16.

The ground roller 8 instead of being a conventional solid wooden roller with stud shafts projecting from the ends to act as bearings may advantageously be specially constructed in the manner shown in the drawings. In this construction the round wooden roller 46 is made of two semi-cylindrical portions routed out to receive the shaft 47 and the bearings 48, 48' which bearings in turn receive the shaft 47 which is rigidly mounted between the sides of the frame 6 and which has corresponding bearing surfaces on which the bearings of the roller rotate.

After the shaft, bearings, and wood parts of the roller are assembled, the entire roller is covered with rubber and vulcanized thereby forming a rubber wearing surface and securely holding the wooden parts together and the bearings in place. Since the bearings are entirely enclosed they are free from the effects of dirt, and wear will not occur as in the ordinary ground roller construction. Since the bearing shaft 47 is rigid, it can be used as a tie rod between the two sides of the frame, being securely bolted to both sides of the frame, and a much more stable and rigid structure results than in the ordinary ground roller construction. While very advantageous it is to be understood that this roller construction, although very advantageous and rigid, is not essential to my invention.

The reel 20 is mounted in the frame 4 in the bearings 18. Each drive gear 22 engages the shaft 45 of the reel 20 through a built-in over-running clutch 23. The pinions 22 mesh with and are driven by the ring gears 24 which are located on the inside of the ground wheels 1.

As shown in the drawings the fly knife blades 40 may be secured in the reel, by the sheet metal spiders 42 each formed with ears 44 adapted to fit into corresponding holes provided in the fly knives 40 and to be secured therein by upsetting or spot welding, etc. The spiders themselves may be held to the shaft 45 and any resonance in them is deadened by die-casting a collar 46 onto the shaft in engagement also with each of the spiders so as to hold it in place on the shaft. Although I have shown this novel construction in the drawings, and its use is very advantageous, it is to be understood that any of the conventional constructions of reel may be used without departing from the scope of my present invention.

Extending between and pivoted in the reel frames 4 is a cam shaft 26 on each end of which is located an adjustable cam 28. These cams may be, for example, circular and eccentric on the cam shaft 26. An adjusting lever 30 is mounted on and suitably attached to the cam shaft, e. g., by means of a set screw 32. The cams 28 are located and dimensioned to fit in the forks 34 which are formed above the wheel stud pivot in the ground roller frame 6. In order to secure the cam shaft 26 from accidental turning a set screw 36 is provided which, in the example shown, screws against the side of the cam clamping it against the frame and thus preventing rotation of the cam due to vibration or other accidental forces. When the screw 36 is released the cam may be rotated by moving the adjusting lever 30, and thus the entire frame 4 may be rotated about the axis of the wheel studs 2.

The frame 6 is fixed in its relation to the ground at one end by its attachment to the wheel axis 2 and at the other end by its attachment at the axis of the ground roller 8.

In the operation of the lawn mower of my present invention the set screw 36 is normally tightened to prevent turning of the cam shaft 26 and the cams 28. As long as the position of these cams is fixed, the relationship of the two frames 4 and 6 is fixed, and there can be no change in the relative positions of the two frames, and the height of the bed knife and height of cut is thereby fixed. When, however, it is desired to change the height of cut it is necessary only to loosen the set screw 36 and turn the lever 30. Turning this lever turns the cam shaft 26 and the cams 28, all of which are attached to and a part of the reel frame 4. Turning the cam in the fork 34 forces the fork and the frame 6 to rotate about their pivotal axis, the wheel stud 2.

If the cam shaft is rotated in such a direction as to rotate the frame 4 in a direction which swings the bed knife forward, both the reel 20 and the bed knife 16 will be lowered with respect to the ground and a shorter cut will result; whereas, if on the other hand the cam shaft is rotated so as to cause the frame 4 to rotate in an opposite direction about the wheel axis 2, the bed knife and the reel will be raised and the length of cut grass left by the machine will be lengthened.

After the desired height of cut is obtained by turning the lever 30 to the proper position, it is necessary merely to tighten up the set screw 36, and the machine will stay at this adjustment until the set screw is again loosened for a further adjustment.

Since the entire cutting mechanism moves as a unit with the reel frame 4 about the same axis as the ground wheels 1, it is obvious that any change in position of the reel frame 4 relative the ground roller and handle frame 6 will not change the relative position of the clutch 23, the gear 22 and the ring gear 24; and that perfect engagement will occur no matter what the adjustment of the reel frame 4.

It is also an important feature of my invention that, since the relative position of the ground roller and the wheel axis is fixed, adjustment of the height of cut does not affect the position or angle at which the handle acts, and, therefore, does not affect the direction along which force is applied to the machine. This is a very important feature since, as I have pointed out in my Patent No. 2,152,278, granted March 28, 1939, there is one angle which is better than all others; but it has not heretofore been possible precisely to retain such an angle when the height of cut has been adjusted. This angle is such that the moment of the force directed along the handle plus the moment of the force of gravity are greater than the moments of any inertial forces tending to throw the ground roller up from the ground and the point of attachment of the handle is such that this condition still persists even if the ground roller is lifted substantially by the contours of the ground. Ordinarily this will mean that the point of attachment should be near or below the level of the ground wheel axis and the line of force applied by the handle should pass close to or behind the line of contact of the ground wheels with the ground.

I have shown in my drawings and in the above description the use of an eccentric to adjust the relative angle between the two frames. While I have found this type of cam to be a very efficient way of adjusting this angle it is to be understood, of course, that there are a number of other forms of cam and other means which would be simple and effective. For example, the two frames might be connected by a pin or bolt engaging holes in the two frames at varying distances. Or the relationship of the cam and the fork might be reversed, of course, the fork being on the frame 4 and the cam shaft attached to the ground roller frame 6. Or a manual worm gear might be used with the worm attached to one frame and the worm wheel attached to the other frame coaxial with the pivot 3.

In the above description I have not gone into detail in the operation of the reel and bed knife and the relationship between these parts and the rest of the mower, since these relationships will be found fully described in my copending applications and issued United States patents as follows: Serial Nos. 256,378, now Patent No. 2,266,165 granted December 16, 1941; and 256,379, filed February 14, 1939, now Patent No. 2,305,138 granted December 15, 1942; Serial No. 267,225, filed April 11, 1939; and Patents Nos. 2,183,544 and 2,183,545, issued December 19, 1939.

What I claim is:

1. A mower of the type having side frames, wheels rotatably mounted on the side frames, a rotary reel and bed knife mounted in accurate alignment and shearing relation between the side frames, handle connecting arms connected to said side frames and pivotally adjustable thereon, a ground roller rotatably mounted on said handle connecting arms, and a handle connected to said arms, in which mower the side frames are rigidly connected to each other by spaced cross bars fixed thereto in predetermined relation, said cross bars maintaining said relation independently of said handle connecting arms and of their angular adjustment, whereby the side frames, together with the cross bars, reel and bed knife, without disturbing or releasing their fixed relation, may be rotated as a unit about the axis of the wheels and adjusted angularly with relation to said arms.

2. A mower of the type having side frames, wheels rotatably mounted on the side frames, a rotary reel and bed knife mounted in accurate alignment and shearing relation between the side frames, handle connecting arms connected to said side frames and pivotally adjustable thereon, a ground roller rotatably mounted on said handle connecting arms, and a handle connected to said arms, in which mower the side frames are rigidly connected to each other by a cross bar fixed thereto in predetermined relation, said cross bars maintaining said relation independently of said handle connecting arms and of their angular adjustment, whereby the side frames, together with the cross bar, reel and bed knife, without disturbing or releasing their fixed relation, may be rotated as a unit about the axis of the wheels and adjusted angularly with relation to said arms, and the reel is positioned, when the ground roll and wheels are on level ground, with its axis at an angle to the vertical about the axis of the wheels such that, throughout the range of normal adjustment of the handle connecting arms to vary the height of cut, the reel axis is moved more vertically than horizontally.

3. A mower of the type having side frames, wheels rotatably mounted on the side frames, a rotary reel and bed knife mounted in accurate alignment and shearing relation between the side frames, handle connecting arms connected to said side frames and pivotally adjustable thereon, a ground roller rotatably mounted on said handle connecting arms, and a handle connected to said arms, in which mower the side frames are rigidly connected to each other by a cross bar fixed thereto in predetermined relation, said cross bars maintaining said relation independently of said handle connecting arms and of their angular adjustment, whereby the side frames, together with the cross bar, reel and bed knife, without disturbing or releasing their fixed relation, may be rotated as a unit about the axis of the wheels and adjusted angularly with relation to said arms, a cam shaft is mounted in the side frames with a cam at each end thereof engaging one of the handle connecting arms for adjusting the height of cut by rotating the side frames relative to said arms, and a manually operated lock holds the cam shaft in adjusted position.

4. A lawn mower which comprises ground wheels, a ground roller, a fixed rigid frame connecting the ground wheels with the roller, and with a handle pivotally mounted on said frame, a second frame pivoted with respect to the first about the axis of the ground wheels and carrying a bed knife and a cutting reel, said second frame having a circular off center cam which interfits with a fork in the first frame, an adjusting handle attached to said cam for turning the cam, and a locking screw engaging said cam assembly to prevent its turning when the screw is tightened, the cam and fork being arranged with respect to the wheel axis so that turning the cam changes the relative position of the two frames and varies the height of cut.

RICHARD D. CLEMSON.